(12) United States Patent
Rom et al.

(10) Patent No.: US 8,140,853 B2
(45) Date of Patent: Mar. 20, 2012

(54) MUTUALLY EXCLUDED SECURITY MANAGERS

(75) Inventors: Eran Rom, Tel Aviv (IL); Sivan Tal, Yokneam Ilit (IL)

(73) Assignee: International Business Machines Corporation, Armonk, NY (US)

( * ) Notice: Subject to any disclaimer, the term of this patent is extended or adjusted under 35 U.S.C. 154(b) by 913 days.

(21) Appl. No.: 12/165,974

(22) Filed: Jul. 1, 2008

(65) Prior Publication Data

US 2010/0005312 A1    Jan. 7, 2010

(51) Int. Cl.
*G06F 21/00* (2006.01)
(52) U.S. Cl. ............................. 713/182; 713/156; 726/5
(58) Field of Classification Search .......... 713/155–157, 713/182, 185; 726/5, 10, 28
See application file for complete search history.

(56) References Cited

U.S. PATENT DOCUMENTS

| | | | |
|---|---|---|---|
| 4,240,143 A | 12/1980 | Besemer et al. | |
| 6,263,446 B1 * | 7/2001 | Kausik et al. | 726/5 |
| 6,279,111 B1 * | 8/2001 | Jensenworth et al. | 726/10 |
| 6,732,278 B2 * | 5/2004 | Baird et al. | 726/7 |
| 7,194,763 B2 * | 3/2007 | Potter et al. | 726/7 |
| 7,370,202 B2 * | 5/2008 | Appenzeller et al. | 713/171 |
| 7,398,550 B2 * | 7/2008 | Zick et al. | 726/5 |
| 7,614,078 B1 * | 11/2009 | Stieglitz | 726/2 |
| 7,644,277 B2 * | 1/2010 | Nito | 713/171 |
| 7,646,874 B2 * | 1/2010 | Iwamoto et al. | 380/278 |
| 7,676,829 B1 * | 3/2010 | Gui et al. | 726/5 |
| 2004/0123104 A1 * | 6/2004 | Boyen et al. | 713/165 |
| 2008/0022120 A1 | 1/2008 | Factor et al. | |

FOREIGN PATENT DOCUMENTS

WO    WO2007141206    12/2007

OTHER PUBLICATIONS

Li, Zhongmin et al "A Credential-based Security Mechanism for Object-based Storage" [Online], Jun. 25-28, 2006 [Retrieved on Jun. 2, 2011], 2006 International Conference on Communications, Circuits and Systems Proceedings [Retrieved from: http://ieeexplore.ieee.org/stamp/stamp.jsp?tp=&arnumber=4064207].*

M.K. Aguilera et al. "Block-Level Security for Network-Attached Disks," Proc. 2nd USENIX Conference on File and Storage Technologies, Mar. 2003, 16 pages.

(Continued)

*Primary Examiner* — Philip Chea
*Assistant Examiner* — Eric W Shepperd
(74) *Attorney, Agent, or Firm* — Suzanne Erez; Ryan, Mason & Lewis, LLP

(57) ABSTRACT

A shared key and a private key unique to one or more resource sets are generated. Each of the resource sets identifies the resource. The shared key and the private key are transmitted to a security access point. The security access point controls access to the resource. A resource key is generated. The resource key is a result of a cryptographic function of the private key and a resource identifier. The resource key and the shared key are transmitted to one or more local security managers. Each of the local security managers is assigned to manage one of the resource sets. In accordance with one or more policies, the local security managers generate a credential using the resource key and the shared key. The credential is distributed to one or more authenticated clients. Further, the credential is used to grant the one or more authenticated clients access to the resource sets through the security access point.

25 Claims, 4 Drawing Sheets

OTHER PUBLICATIONS

A.W. Leung et al., "Scalable Security for Large, High Performance Storage Systems," Proceedings of the Second ACM Workshop on Storage Security and Survivability, ACM, Oct. 2006, 11 pages, Virginia.

B.C Neuman, "iPolicy Security Manager,"http://www.ipolicynetworks.com/products/ism.html, International Conference on Distributed Computing Systems 1993, 3 pages.

T. Ts'o, "Telnet Authentication: Kerberos Version 5," Network Working Group Standards Track RFC 2942, Sep. 2000, pp. 1-7.

M. Factor et al., "Capability Based Secure Access Control to Networked Storage Devices," Procs. of the 24th IEEE Conference on Mass Storage Systems and Technologies, 2007, pp. 114-128, Washington.

B.C. Neuman, "Proxy-Based Authorization and Accounting for Distributed Systems," Proc. of the 13th International Conference on Distributed Computing Systems, May 1993, pp. 283-291, Pittsburgh.

* cited by examiner

100

200

300

500

600

MUTUALLY EXCLUDED SECURITY MANAGERS

FIELD OF THE INVENTION

The present invention generally relates to access control, particularly, to techniques for managing access to resources.

BACKGROUND OF THE INVENTION

Self describing capabilities are a well known mechanism for enforcing access control. In practice, capabilities mechanisms usually involve three parties. First, there is a client who wants access to a certain shared resource. Next, there is a security/policy manager who provides the client with a credential, which enables the client to access the shared resource. The credential is often a cryptographically hardened capability. The capability encodes the access rights of the client to the shared resource and is usually derived from a predefined policy. Finally, there is an enforcement point, or security access point. The client's access to the shared resource is through the security access point, which validates the capability of the client and either permits or denies access to the resource. The validation process usually involves a secret key that is shared between the security manager and the security access point.

Although useful, capabilities mechanisms suffer a practical problem. Managing the access control of many clients to many shared resources might be too much for a single security manager or administrator. Too many clients and resources overburden the security manager and results in bottlenecks. In terms of the number of keys that need to be maintained, both the security manager and the security access point must share a secret in the form of a unique key for each shared resource for increased security. In terms of hardware, tremendous amounts of resources (e.g., RAM and data storage) are required for maintaining these keys and the policies related to individual clients and resources. Further, tremendous amounts of network bandwidth is required to support client connections to obtain credentials and to access the resources via the security access point.

There have been proposals to address these issues; however, none of the proposals offer viable solutions. For example, Block-Level Security for Network-Attached Disks introduces the idea of capability groups, which reduces the load on a security manager by limiting the number of capabilities that can be revoked at once. See M. K. Aguilera et al., "Block-Level Security for Network-Attached Disks," Proc. 2nd USENIX Conference on File and Storage Technologies, 2003. However, this proposed mechanism is targeted to block devices and is not applicable to general purpose self describing capabilities mechanisms. Next, Scalable Security for Large, High Performance Storage Systems introduces several methods for reducing the load on the security manager. See A. W. Leung et al., "Scalable Security for Large, High Performance Storage Systems," StorageSS '06: Proceedings of the second ACM workshop on Storage security and survivability, ACM Press. At the heart of these methods is the assumption that many shared resources and clients can be grouped to represent a higher level logical entity to which capabilities are granted. However, this assumption is not valid for generally shared resources. Particularly, this proposal does not address managing the numerous permission policies affecting individual user access to shared resources. One underlying limitation of both proposals is that they both rely on the idea that a single security administrator must manage all the clients and resources.

SUMMARY OF THE INVENTION

Principles of the present invention provide techniques that overcome the above-mentioned drawbacks associated with existing methods by providing techniques that address the above needs, as well as other needs. Particularly, principles of the invention provide techniques for separating the duties of managing access control over multiple resources.

For example, in one embodiment of the invention, a technique for controlling access to at least one resource is presented. At least one shared key and at least one private key unique to one or more resource sets are generated. Each of the one or more resource sets identify the at least one resource. The at least one shared key and the at least one private key are transmitted to a security access point. The security access point controls access to the at least one resource. At least one resource key is generated. The resource key is a cryptographic function of the at least one private key and at least one resource identifier. The at least one resource key and the at least one shared key are transmitted to one or more local security managers. Each of the one or more local security managers being assigned to manage one of the one or more resource sets, wherein the one or more local security managers generate, in accordance with one or more policies, at least one credential using the at least one resource key and the at least one shared key, wherein the at least one credential is distributed to one or more authenticated clients, the at least one credential being used to grant the one or more authenticated clients access to the one or more resource sets through the security access point.

In additional embodiments, the above technique for controlling access to at least one resource may be carried out by an apparatus and/or a system comprising one or more units.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
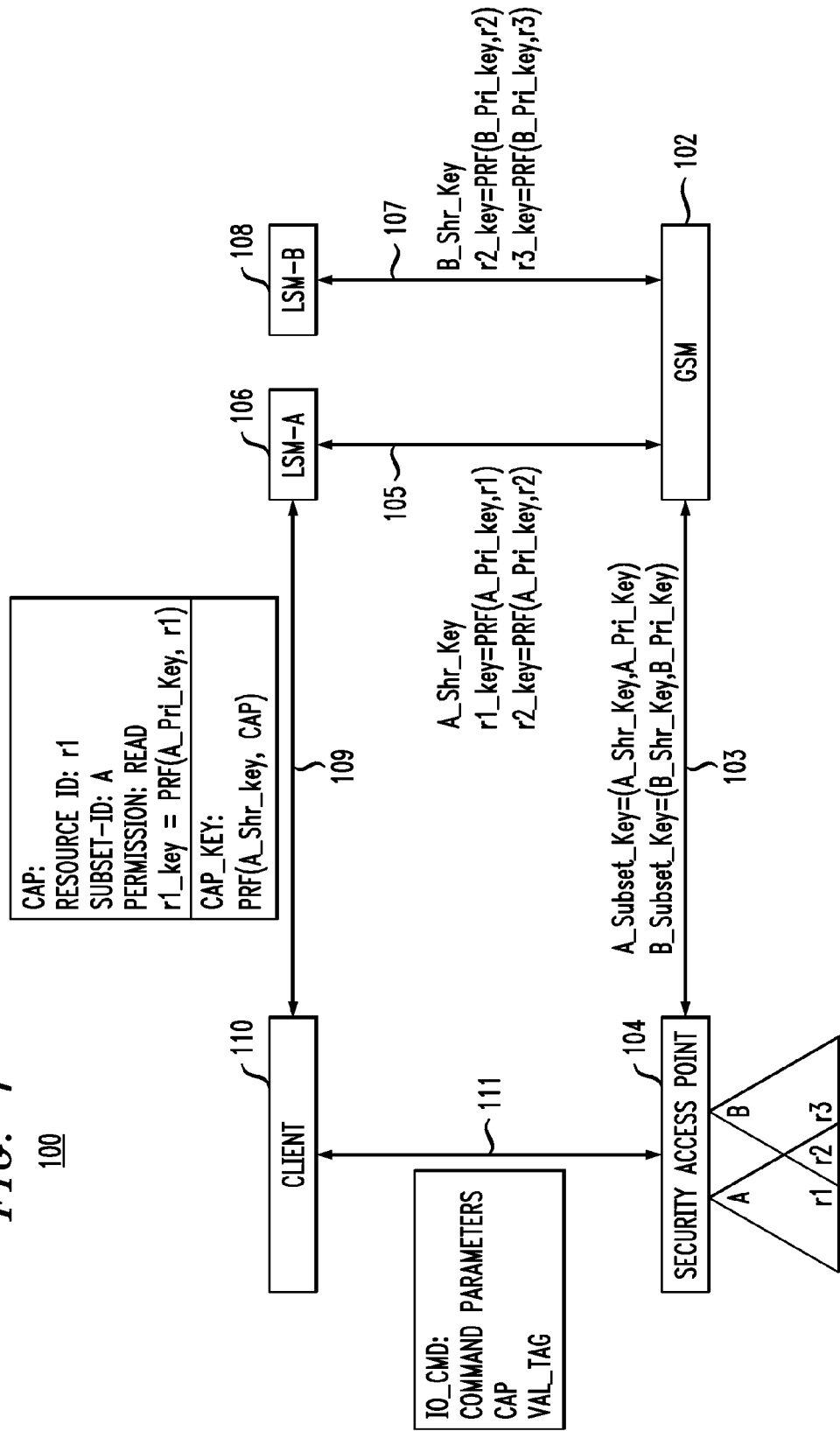
FIG. 1 is a diagram illustrating an exemplary system for controlling access to at least one resource, according to an embodiment of the present invention.

The present invention will be described in conjunction with exemplary methods for controlling access to at least one resource. Specifically, the present disclosure will illustrate techniques for allocating the management of access to a pool of shared resources to one or more local security managers (LSMs). It should be understood, however, that the invention is not limited to the particular embodiments described herein and modifications to the illustrative embodiments will become apparent to those skilled in the art given the teachings described herein.

The term "client" as used herein is intended to be construed broadly so as to encompass, by way of example and without limitation, any entity, which includes but is not limited to a user, an application, a server, and/or a system.

The term "resource" as used herein is intended to be construed broadly so as to encompass, by way of example and without limitation, any item that can be accessed by a client, which includes but is not limited to hardware (e.g., devices, storage, memory), software (e.g., shared applications), and data.

The term "capability" as used herein is intended to be construed broadly so as to encompass, by way of example and without limitation, any communicable token of authority to access a resource. One example of a capability is an encoded access key.

The term "security manager" as used herein is intended to be construed broadly so as to encompass, by way of example and without limitation, any entity that manages access to a resource. One example of a security manager is a server that issues a capability to a client, wherein the capability gives the client the ability to access a particular resource.

The term "security access point" as used herein is intended to be construed broadly so as to encompass, by way of example and without limitation, any point in a networked system where clients are authenticated prior to accessing resources. One example of a security access point is an enforcement point, which validates the capability of a client and either permits or denies access to a secured resource.

To address the problems associated with conventional capability mechanisms, we propose separating the duties in managing access control to sub-groups of clients and resources within a global group of clients and a global pool of resources. In one exemplary embodiment, the separation of access control is achieved by a hierarchical authorization scheme, which enables modular and scalable security management.

In one embodiment of the present invention, a two-tier hierarchical policy/security management system is provided. In the two-tier hierarchical management system, there is a global security manager (GSM) and one or more LSMs. The GSM selects and designates shared resources to each of the LSMs, giving the LSMs the authority to manage access to those shared resources designated to them. Each LSM has the power to grant one or more capabilities to clients. The one or more capabilities give a client the ability to access one or more shared resources or sets of shared resources.

By utilizing such a hierarchy, each LSM only needs to know about the resources assigned to it by the GSM. Further, this system limits the number of clients requesting capabilities from an individual LSM. It should be noted that the GSM may assign a resource in high demand to multiple LSMs, thereby reducing any bottleneck on an individual LSM. The GSM may also group shared resources into resource sets, thereby reducing the number of individual resources to be managed. Further, one resource may be a member of multiple resource sets assigned to multiple LSMs; this overlapping system of organization enables flexibility in terms of assigning clients to LSMs.

This hierarchal arrangement further reduces bottlenecks at a security access point. The security access point is where clients are validated prior to gaining access to shared resources. Also, security setup information of the security access point may be proportional to the number of LSMs, rather than to the number of managed resources, which is usually a much higher number.

Referring initially to FIG. 1, a diagram illustrates an exemplary system for controlling access to at least one resource, according to an embodiment of the present invention. System 100 exemplifies a two-tier hierarchical access control management system that effectively assigns shared resources, r1, r2, and r3, to resource sets, A and B, managed by LSMs 106 and 108. In this example, a GSM 102 assigns the management of resource sets A and B, comprising resources r1 and r2, and r2 and r3, respectively, to LSM-A 106 and LSM-B 108, respectively. It should be appreciated that the present system may support any number of shared resources and any number of LSMs may be utilized, not only two. Under this tiered GSM and LSM system, one or more clients 110 interested in accessing a resource may request capabilities from the LSM managing the resource of interest. Capabilities give a client 110 the right to access a resource of interest via the security access point 104. Prior to providing access, the security access point 104 verifies the access rights of a client 110 by validating the capabilities possessed by the client 110.

The GSM 102 utilizes the following key scheme to organize and assign resource sets to LSMs 106 and 108. In the example of FIG. 1, the GSM 102 designates a subset key for each resource set (setID), A and B. The subset key (setID_Subset_Key) may comprise a shared key (setID_Shr_Key) and a private key (setID_Pri_Key):

setID_Subset_Key={setID_Shr_Key, setID_Pri_Key}

In an exemplary embodiment, the shared key and the private key are generated in an independent way and neither is derived from the other. This is done to maximize security and prevent forgery if one has access to one of the two keys. Further, the shared key is shared amongst the GSM 102, the LSMs (e.g., 106 and 108), and the security access point 104, and the private key is only known to the GSM 102 and the security access point 104. By distributing shared keys and private keys in this fashion, the GSM may ensure that a given LSM can only issue capabilities for resources the LSM is in charge of, as will be described below.

As stated, the GSM 102 may not share the private key to a resource with a LSM; however, the GSM 102 may present the LSM an encrypted version of the private key, which will ultimately be used by the security access point 104 to verify capabilities issued by that LSM. In an illustrative embodiment, the GSM 102 generates and transmits a resource key unique to a particular resource (e.g., r1, r2, r3) to one or more LSMs. By doing so, the GSM 102 is delegating the management of access to those resources. The resource key (resID_Key) may be a hash of a unique identifier of a shared resource (resID) (e.g., "r1", "r2", "r3") based on a private key of the resource set in which the shared resource is a member (setID_Pri_Key):

resID_Key=PRF(setID_Pri_Key, resID), where PRF is a pseudo-random function.

Utilizing the above key mechanism, the GSM 102 generates shared keys and private keys unique to resource sets A and B, where resource set A comprises resources r1 and r2, and resource set B comprises resources r2 and r3. At flow 103, the GSM 102 transmits a subset key to the security access point 104 for each resource set (e.g., resource sets A and B). Each subset key (setID_Subset_Key) comprises a shared key (setID_Shr_Key) and a private key (setID_Pri_Key) unique to a specific resource set (setID):

setID_Subset_Key={setID_Shr_Key, setID_Pri_Key}

At flow 105, the GSM 102 assigns LSM-A 106 resource set A by transmitting the shared key for resource set A (e.g., A_Shr_key). Further, the GSM 102 generates and transmits unique resource keys for each shared resource of resource set A (e.g., r1_key and r2_key) to LSM-A 106. At flow 107, the GSM 102 assigns LSM-B 108 resource set B by transmitting the shared key for resource set B (e.g., B_Shr_key). Further, the GSM 102 generates and transmits unique resource keys for each shared resource of resource set B (e.g., r2_key and r3_key) to LSM-B 108. In one exemplary embodiment, each shared key is sent to its perspective LSM over a secure channel to prevent unauthorized interception of the key. This system prevents a malicious LSM from forging credentials to unassigned resource sets. As will be described below, credentials give a client access to specific resources. Further, even if the malicious LSM gains access to a certain resource key, it cannot use the resource key to forge credentials because the malicious LSM does not have the shared key corresponding to the private key used to calculate the resource key (see flow 109 for additional details).

It should be noted that the LSMs may be considered mutually excluded security managers. For example, the LSMs may not exchange shared keys and resource keys between each other. This ensures that an LSM may only create credentials to those resources assigned to it.

At flow 109, a client 110 wishing to access a particular resource (e.g., r1, r2, r3) may authenticate with the LSM (e.g., LSM-A 106 or LSM-B 108) managing that particular resource. In accordance with policies of a LSM, the LSM may either grant or deny a client 110 access to a resource. It should be noted that a LSM's policies may define which clients are authorized to access a particular resource. If a client is authorized to access a resource or set of resources, the managing LSM may issue a credential to the client 110. The credential may be a cryptographically hardened capability. In one illustrative embodiment, the credential may comprise one or more capabilities (CAP) and a capability key (Cap_Key):

Credential={CAP, Cap_Key}

The one or more capabilities may comprise the identifier of the resource to be accessed by the client 110 (resID), the identifier of the resource set in which the resource is a member (setID), permissions defining the level of access to the resource (e.g., read, write, copy, delete, etc.), and the resource key of the resource (resID_Key):

CAP={resID, setID, permissions, resID_Key}

Further, the capability key (Cap_Key) may be a pseudo-random function of a shared key (setID_Shr_Key) and the one or more capabilities (CAP):

Cap_Key=PRF(setID_Shr_Key, CAP)

After obtaining the credential from a LSM, the client 110 may access the resource of interest by sending an input/output (I/O) command to the security access point 104 (flow 111). The I/O command (IO_CMD) may comprise command parameter (CMD_PARAMS), the one or more capabilities (CAP), and a validation tag (Val_Tag):

IO_CMD={CMD_PARAMS, CAP, Val_Tag}

The command parameters, which may be specified by the client 110, may comprise instructions to the security access point 104 regarding access to the resource (e.g., load, copy, save, write, etc.). Further, the validation tag may be a pseudo-random function of the capability key (Cap_Key) and the one or more capabilities (CAP), all of which were embedded in the credential issued by the managing LSM:

Val_Tag=PRF(Cap_Key, CAP)

The I/O command sent from the client 110 is processed by the security access point 104 and the credential of the client 110 to access a resource is validated. Using the private keys obtained from the GSM 102 at the beginning of the tiered system (flow 103), the security access point 104 generates an expected resource key. The expected resource key (Expected_Resource_Key) may be a pseudo-random function of the private key (setID_Pri_Key) and the identifier of the resource to be accessed (resID):

Expected_Resource_Key=PRF(setID_Pri_Key, resID)

It should be noted that by using CAP→setID, which is embedded in the I/O command sent from client 110, the security access point 104 may select the appropriate private key to be used in the validation process. The generated expected resource key is then compared to the resource key also embedded in the sent I/O command, CAP→resID_Key.

If the expected resource key matches the resource key sent from the client 110, the security access point 104 then computes its own capability key. Like a LSM, the security access point 104 generates a capability key (Cap_Key), which may be a pseudo-random function of a shared key (setID_Shr_Key) and one or more capabilities (CAP):

Cap_Key=PRF(setID_Shr_Key, CAP)

The security access point 104 selects the appropriate shared key using CAP→setID, which is embedded in the I/O command sent from client 110.

The security access point 104 then computes an expected validation tag using the generated capability key. The expected validation tag (Expected_Val_Tag) may be a pseudo-random function of the generated capability key (Cap_Key) and the one or more capabilities (CAP) received from the client 110:

Expected_Val_Tag=PRF(Cap_Key, CAP)

The expected validation tag is then compared to the validation tag embedded in the sent I/O command. If the two tags match, the client 110 may be given access to the resource of interest. However, it is to be understood that the level of access to a given resource may still be limited by the permissions (e.g., read, write, copy, delete, etc.) defined by a managing LSM at flow 109.

Using this tiered mechanism, even if resource keys are passed "in the clear" (e.g., being part of the I/O command), an eavesdropper cannot make use of them because he/she needs the correct capability key in order to compute the correct validation tag; it should be noted that the I/O command sent to the security access point 104 does not contain capability keys. Further, the eavesdropper would need the correct shared key to compute the correct capability key, which may be difficult because the shared key may be passed from the GSM 102 to a LSM (e.g., LSM-A 106, LSM-B 108) in a secure way.

In an exemplary embodiment, all computations of the above mechanism may be cached so that additional hash computations would not degrade the overall performance of the system (e.g., reduced bottlenecking). Further, if a large number of resources are shared between multiple resource sets, the security access point 104 may allocate sufficient caching space in the order of, the total number of resource sets multiplied by the total number of resources.

Figure 2:
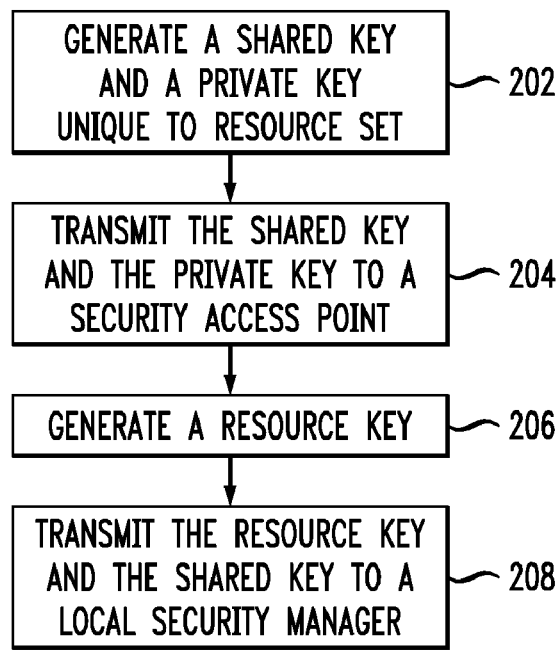
FIG. 2 is a flow diagram illustrating a methodology of a global security manager, according to an embodiment of the present invention.

Referring now to FIG. 2, a flow diagram illustrates a methodology of a GSM, according to an embodiment of the present invention. As described in FIG. 1, a GSM 102 manages the assignment of resources to one or more LSMs (e.g., LSM-A 106 and LSM-B 108). Methodology 200 begins at step 202, where the GSM generates a shared key and a private key unique to a resource set. The resource set may comprise any number of resources and one resource may belong to multiple resource sets. In an exemplary embodiment, the shared key and private key may be independently generated. This is done to prevent forgery if one has access to one of the two keys.

At step 204, the GSM transmits the shared key and the private key to a security access point (see FIG. 1, flow 103). The security access point controls access to shared resources. In one embodiment, the shared key and the private key are both transmitted as one subset key (see FIG. 1, flow 103), wherein the shared key and the private key are embedded into the subset key. The security access point uses the subset key to verify clients interested in accessing a shared resource.

The GSM assigns a resource set to a LSM by generating resource keys (step 206) unique to each resource of the resource set. A resource key may be a cryptographic function (e.g., pseudo-random function) of a private key and an identifier of a resource. After a resource key is generated, the GSM transmits the shared key, generated at step 202, and the resource key to a LSM designated to manage the resource set (see FIG. 1, flows 105 and 107).

Figure 3:
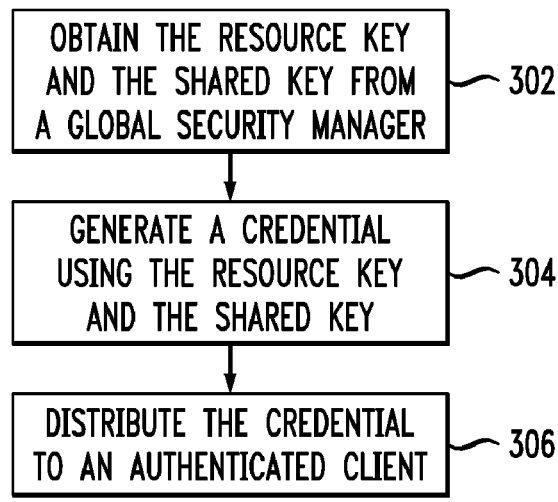
FIG. 3 is a flow diagram illustrating a methodology of a local security manager, according to an embodiment of the present invention.

Referring now to FIG. 3, a flow diagram illustrates a methodology of a LSM, according to an embodiment of the present invention. As described in FIG. 1, a LSM (e.g., LSM-A 106, LSM-B 108) manages access to a resource by issuing credentials to clients requesting access to the resource. Methodology 300 begins at step 302, where a LSM obtains a resource key and a shared key from the GSM (see FIG. 2, step 208). In response to a client requesting access to a resource, the LSM authenticates the client in accordance with one or more policies. The policies may define if a client is allowed to access a particular resource (e.g., target resource). If the client has the authority to access the target resource, the LSM generates a credential using the resource key and the shared key (step 304), both of which were obtained from the GSM at step 302.

The credential may comprise one or more capabilities (i.e., capability attributes) and a capability key. The capability attributes may comprise an identifier of the target resource, an identifier of the resource set in which the target resource belongs, one or more resource permissions (e.g., read, write, copy, delete, etc.), and the resource key. The capability key may be a cryptographic function of the shared key and the capability attributes.

At step 306, the credential is then distributed to authenticated clients (see FIG. 1, flow 109). An authenticated client may use the credential at the security access point (see FIG. 1, flow 111) to gain access to the target resource.

Figure 4:
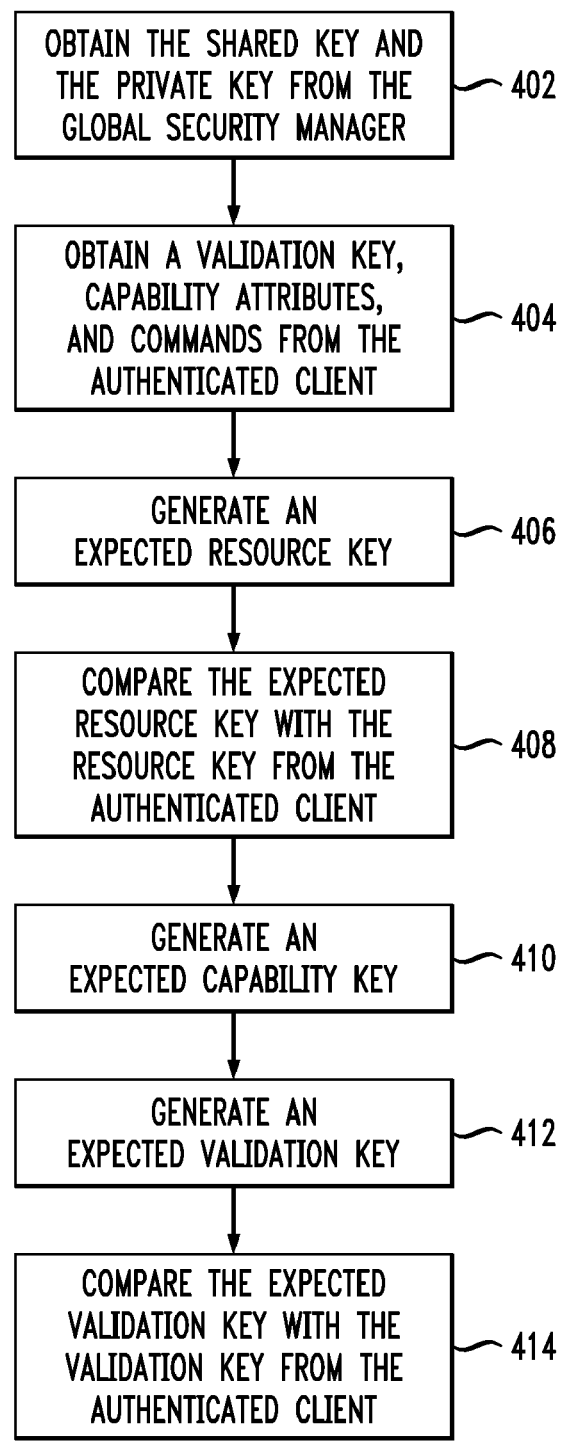
FIG. 4 is a flow diagram illustrating a methodology of a security access point, according to an embodiment of the present invention.

Referring now to FIG. 4, a flow diagram illustrates a methodology of a security access point, according to an embodiment of the present invention. As described in FIG. 1, the security access point 104 controls client access to shared resources. Methodology 400 begins at step 402, where the security access point obtains the shared key and the private key to a resource set from the GSM (see FIG. 2, step 204). At this point, the security access point simply waits until a client attempts to access a shared resource. During the interim, clients are authenticated and credentials are distributed by LSMs as described in methodology 300.

At step 404, the security access point obtains a validation tag (i.e., validation key), capability attributes, and commands (e.g., load, copy, save, write, etc.) from a client attempting to gain access to a target resource. It should be noted that the obtained capability attributes are part of the credential distributed by an LSM managing the target resource, as described in FIG. 3. The validation tag may be generated by the client and may be a cryptographic function of the capability attributes and a capability key, which is also obtained from the managing LSM.

Before the security access point gives a client access to a target resource, the client is validated. When validating the client, the security access point generates an expected resource key (step 406). The expected resource key may be a cryptographic function of a private key and an identifier of the target resource. It should be appreciated that the private key is obtained from the GSM at step 402. Further, the security access point may identify the appropriate private key from a collection of private keys, by acquiring the identifier of the resource set in which the target resource is a member. This information is located within the capability attributes supplied by the client. Further, the identifier of the target resource used to generate the expected resource key is also within the capability attributes supplied by the client.

At step 408, the expected resource key is then compared to the resource key found within the capability attributes supplied by the client. If the keys do not match, the client is denied access. If the keys match, the security access point generates an expected capability key (step 410). The expected capability key may be a cryptographic function of a shared key and the capability attributes submitted by the client. It should be appreciated that the shared key is obtained from the GSM at step 402. Further, the security access point may identify the appropriate shared key from a collection of shared keys, by acquiring the identifier of the resource set in which the target resource is a member. As in step 406, this information is found within the capability attributes supplied by the client. It should be noted that the expected capability key may be the same as the capability key generated by an LSM managing the target resource as described in methodology 300. However, this comparison may not be made because the capability key from the LSM is not shared with the security access point, which may be done to prevent forged access.

At step 412, the security access point generates an expected validation tag with the generated expected capability key. The expected validation tag may be the cryptographic function of the expected capability key and the capability attributes obtained from the client. At step 414, the security access point compares the expected validation tag with the validation tag submitted by the client. If the keys match, the security access point allows the client access to the target resource. If the keys do not match, the client is denied access.

Figure 5:
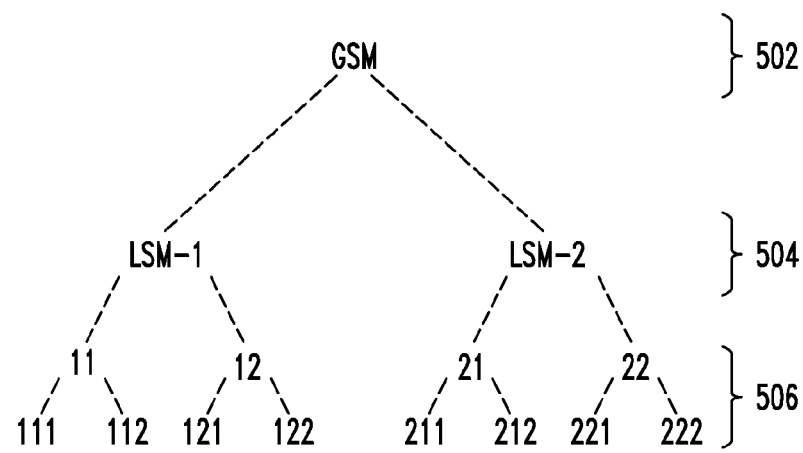
FIG. 5 is a tree diagram illustrating a multi-tiered security management system, according to an embodiment of the present invention.

Referring now to FIG. 5, a tree diagram illustrates a multi-tiered security management system, according to an embodiment of the present invention. Using a Merkel like hash tree 500, the techniques described above can be easily extended to more than two tiers of security management. Assume a tree structure comprising a GSM 502 and multiple LSMs, where each LSM 504 might have an arbitrary number of sub-LSMs 506. The identifier of the LSMs and sub-LSMs may be determined in a recursive manner, where the identifier of an LSM or sub-LSM is derived from a parent LSM. In the illustrative example of FIG. 5, the LSM and sub-LSMs are numbered from left to right. The identifier of a left sibling of GSM 502 (LSM-1) is 1. The identifier of a right sibling of GSM 502 (LSM-2) is 2. A sub-LSM receives the identifier of its parent LSM with an additional prefix; therefore, the left sibling of LSM-1 is 11 and the right sibling of LSM-1 is 12. Next, the left sibling of sub-LSM 11 is 111 and the right sibling of sub-LSM 11 is 112, etc.

In an exemplary embodiment, the subset key to be associated with a sub-LSM is derived in a recursive manner as follows. First, the GSM 502 generates a root subset key:

root_Subset_Key={root_Shr_Key, root_Pri_Key},
where root is an identifier.

The subset key of a left sibling of sub-LSM (i1, . . . ij), where i is the identifier of the sub-LSM's parent, may be:

(1, i1, . . . ij)_Subset_Key={(1, i1, . . . ij)_Shr_Key, (1, i1, . . . ij)_Pri_Key},
where:
(1, i1, . . . ij)_Shr_Key=PRF((i1, . . . ij)_Shr_Key), (1, i1, . . . ij)), and
(1, i1, . . . ij)_Pri_Key=PRF((i1, . . . ij)_Pri_Key), (1, i1, . . . ij))

Similarly, the subset key of a right sibling of sub-LSM (i1, . . . ij) may be:

(2, i1, . . . ij)_Subset_Key={(2, i1, . . . ij)_Shr_Key, (2, i1, . . . ij)_Shr_Key},
where:
(2, i1, . . . ij)_Shr_Key=PRF((i1, . . . ij)_Shr_Key), (2, i1, . . . ij)), and
(2, i1, . . . ij)_Pri_Key=PRF((i1, . . . ij)_Pri_Key), (2, i1, . . . ij))

The resource keys and capability keys are defined exactly in the same manner as described above with reference to FIG. 1. However, GSM 502 only needs to transmit the root subset key to the security access point. The security access point may then derive the appropriate shared keys and private keys according to the CAP→setID. This scheme may imply more calculations at the security access point (e.g. validation process); however, all these calculations may be cached.

Figure 6:
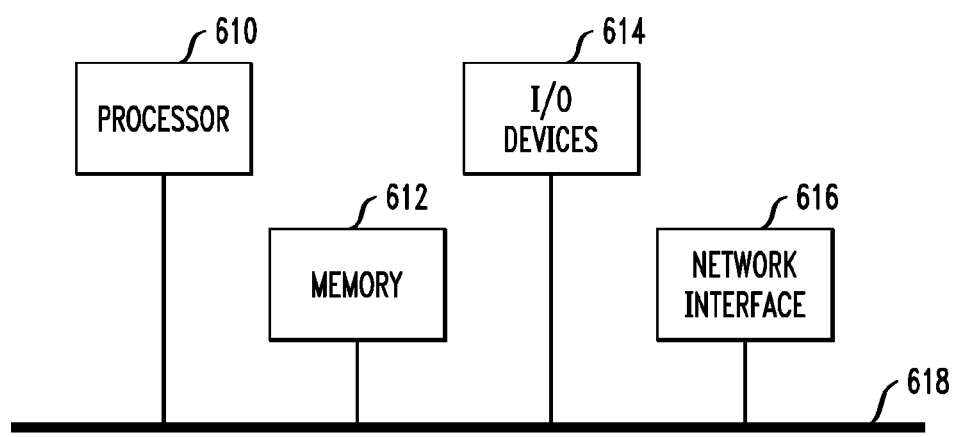
FIG. 6 is a diagram illustrating an illustrative hardware implementation of a computing system in accordance with which one or more components/methodologies of the present invention may be implemented, according to an embodiment of the present invention.

Referring now to FIG. 6, block diagram 600 illustrates an exemplary hardware implementation of a computing system in accordance with which one or more components/methodologies of the invention (e.g., components/methodologies described in the context of FIGS. 1-5) may be implemented, according to an embodiment of the present invention.

As shown, the techniques for controlling access to at least one resource may be implemented in accordance with a processor 610, a memory 612, I/O devices 614, and a network interface 616, coupled via a computer bus 618 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, or a magnetic storage device.

Computer program code for carrying out operations of the present invention may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Further, the present invention was described above with reference to diagrams of methods, apparatus (systems), and computer program products according to embodiments of the invention. It will be understood that individual functions/acts in the diagrams, and combinations of functions/acts in the diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the diagrams.

These computer program instructions may also be stored in a computer-readable medium that may direct a computer or other programmable data processing apparatus to function in a particular manner, such that the instructions stored in the computer-readable medium produce an article of manufacture including instruction means which implement the functions/acts specified in the diagrams.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the diagrams.

The diagrams illustrate the architecture, functionality, and operation of possible implementations of systems, methods, and computer program products according to various embodiments of the present invention. In this regard, individual functions/acts in the diagrams may represent a module, segment, or portion of code, which comprises one or more executable instructions for implementing the specified logical function(s). It should also be noted that, in some alternative implementations, the functions/acts in the diagrams may occur out of the order noted in the diagrams. For example, two steps shown in succession may, in fact, be executed substantially concurrently, or the steps may sometimes be executed in the reverse order, depending upon the functionality involved. It will also be noted that individual functions/acts in the diagrams, and combinations of functions/acts in the diagrams, may be implemented by special purpose hardware-based systems that perform the specified functions or acts, or combinations of special purpose hardware and computer instructions.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for controlling access to at least one resource, the method comprising the steps of:
   generating at least one shared key and at least one private key unique to one or more resource sets, wherein each of the one or more resource sets identify the at least one resource;
   transmitting the at least one shared key and the at least one private key to a security access point, wherein the security access point controls access to the at least one resource;
   generating at least one resource key, wherein the at least one resource key is a result of a cryptographic function of the at least one private key and at least one resource identifier; and
   transmitting the at least one resource key and the at least one shared key to one or more local security managers, each of the one or more local security managers being assigned to manage one of the one or more resource sets, wherein the one or more local security managers generate, in accordance with one or more policies, at least one credential using the at least one resource key and the at least one shared key, wherein the at least one credential is distributed to one or more authenticated clients, the at least one credential being used to grant the one or more authenticated clients access to the one or more resource sets through the security access point.

2. The method of claim 1, wherein the at least one credential distributed to the one or more authenticated clients comprise at least one of at least one capability attribute and at least one capability key.

3. The method of claim 2, wherein the at least one capability attribute comprises at least one of the at least one resource identifier, at least one resource set identifier, at least one resource permission, and the at least one resource key.

4. The method of claim 3, wherein the at least one capability key is a result of a cryptographic function of the at least one shared key and the at least one capability attribute.

5. The method of claim 3, wherein the one or more authenticated clients generate at least one validation key, wherein the at least one validation key is a result of a cryptographic function of the at least one capability key and the at least one capability attribute.

6. The method of claim 5, wherein the one or more authenticated clients transmit at least one of the at least one validation key, the at least one capability attribute, and at least one command, to the security access point.

7. The method of claim 6, wherein the security access point generates at least one expected resource key, wherein the at least one expected resource key is a result of a cryptographic function of the at least one private key and the at least one resource identifier.

8. The method of claim 7, wherein the at least one expected resource key is compared to the at least one resource key transmitted by the one or more authenticated clients.

9. The method of claim 6, wherein the security access point generates at least one expected capability key, wherein the at least one expected capability key is a result of a cryptographic function of the at least one shared key and the at least one capability attribute.

10. The method of claim 9, wherein the security access point generates at least one expected validation key, wherein the at least one expected validation key is a result of a cryptographic function of the at least one expected capability key and the at least one capability attribute.

11. The method of claim 10, wherein the at least one expected validation key is compared to the at least one validation key transmitted by the one or more authenticated clients.

12. The method of claim 11, wherein the cryptographic function is a pseudo-random function.

13. An article of manufacture for controlling access to at least one resource, the article comprising a computer readable storage device including one or more programs, which when executed by a computer implement the steps of claim 1.

14. An apparatus for controlling access to at least one resource, the apparatus comprising:
   a memory; and
   at least one processor coupled to the memory and operative to: generate at least one shared key and at least one private key unique to one or more resource sets, wherein each of the one or more resource sets identify the at least one resource; transmit the at least one shared key and the at least one private key to a security access point, wherein the security access point controls access to the at least one resource; generate at least one resource key, wherein the at least one resource key is a result of a cryptographic function of the at least one private key and at least one resource identifier; and transmit the at least one resource key and the at least one shared key to one or more local security managers, each of the one or more local security managers being assigned to manage one of the one or more resource sets, wherein the one or more local security managers generate, in accordance with one or more policies, at least one credential using the at least one resource key and the at least one shared key, wherein the at least one credential is distributed to one or more authenticated clients, the at least one credential being used to grant the one or more authenticated clients access to the one or more resource sets through the security access point.

15. The apparatus of claim 14, wherein the at least one credential distributed to the one or more authenticated clients comprise at least one of at least one capability attribute and at least one capability key.

16. The apparatus of claim 15, wherein the at least one capability attribute comprises at least one of the at least one resource identifier, at least one resource set identifier, at least one resource permission, and the at least one resource key.

17. The apparatus of claim 16, wherein the at least one capability key is a result of a cryptographic function of the at least one shared key and the at least one capability attribute.

18. The apparatus of claim 16, wherein the one or more authenticated clients generate at least one validation key, wherein the at least one validation key is a result of a cryptographic function of the at least one capability key and the at least one capability attribute.

19. The apparatus of claim 18, wherein the one or more authenticated clients transmit at least one of the at least one validation key, the at least one capability attribute, and at least one command, to the security access point.

20. The apparatus of claim 19, wherein the security access point generates at least one expected resource key, wherein the at least one expected resource key is a result of a cryptographic function of the at least one private key and the at least one resource identifier.

21. The apparatus of claim 20, wherein the at least one expected resource key is compared to the at least one resource key transmitted by the one or more authenticated clients.

22. The apparatus of claim 19, wherein the security access point generates at least one expected capability key, wherein the at least one expected capability key the a result of a cryptographic function of the at least one shared key and the at least one capability attribute.

23. The apparatus of claim 22, wherein the security access point generates at least one expected validation key, wherein the at least one expected validation key is a result of a cryptographic function of the at least one expected capability key and the at least one capability attribute.

24. The apparatus of claim 23, wherein the at least one expected validation key is compared to the at least one validation key transmitted by the one or more authenticated clients.

25. A system for controlling access to at least one resource, the system comprising:
at least one memory; and
at least one processor coupled to the at least one memory and operative to implement:
a global security manager for: generating at least one shared key and at least one private key unique to one or more resource sets, wherein each of the one or more resource sets identify the at least one resource; and generating at least one resource key, wherein the at least one resource key is a result of a cryptographic function of the at least one private key and at least one resource identifier;
a security access point for obtaining the at least one shared key and the at least one private key from the global security manager, wherein the security access point controls access to the at least one resource; and
one or more local security managers for obtaining the at least one resource key and the at least one shared key from the global security manager, each of the one or more local security managers being assigned to manage one of the one or more resource sets, wherein the one or more local security managers generate, in accordance with one or more policies, at least one credential using the at least one resource key and the at least one shared key, wherein the at least one credential is distributed to one or more authenticated clients, the at least one credential being used to grant the one or more authenticated clients access to the one or more resource sets through the security access point.

* * * * *